United States Patent [19]
Umbaugh et al.

[11] 3,874,337
[45] Apr. 1, 1975

[54] TEMPERATURE RESPONSIVE SYSTEM FOR MILKING APPARATUS

[76] Inventors: Raymond E. Umbaugh, 4150 Baseline Rd., Boulder, Colo. 80303; Jerry H. Polson, 7823 Greenbriar Cir., Boulder, Colo. 80301

[22] Filed: July 30, 1973

[21] Appl. No.: 384,009

[52] U.S. Cl. .......................... 119/14.15, 119/14.17
[51] Int. Cl. ............................................. A01j 7/00
[58] Field of Search............ 119/14.14, 14.15, 14.16, 119/14.08, 14.17; 128/2.05 F; 73/204

[56] References Cited
UNITED STATES PATENTS

| | | | |
|---|---|---|---|
| 2,898,549 | 8/1959 | Miller | 119/14.15 X |
| 3,022,766 | 2/1962 | McKinley | 119/14.14 |
| 3,547,080 | 12/1970 | Russell | 119/14.14 |
| 3,566,841 | 3/1971 | Gerrish | 119/14.15 |
| 3,664,306 | 5/1972 | Quayle et al. | 119/14.14 |
| 3,695,230 | 10/1972 | Quayle et al. | 119/14.14 |

*Primary Examiner*—Hugh R. Chamblee
*Attorney, Agent, or Firm*—Burton, Crandell & Polumbus

[57] ABSTRACT

A temperature responsive system for a milking apparatus is disclosed wherein the temperature of milk received from an animal being milked and conducted through the apparatus is sensed within the apparatus and an electrical signal developed therefrom that is indicative of animal abnormalities and/or the rate of milk flow, the developed electrical signal being utilized to indicate abnormalities and/or milk flow and/or to control milk flow through the apparatus. The apparatus includes a sensing device within the milking apparatus, which sensing device forms a part of an electrical bridge circuit the output of which is coupled to comparators which provide output signals when preselected reference levels are exceeded. The outputs from the comparators are utilized to energize visual and/or audio indicators of both sensed abnormalities and completion of milking, as well as for controlling operation of the milking apparatus by terminating milking when substantial completion of milking is sensed. The sensing device, preferably a thermistor, may be positioned at a variety of locations contiguous to the flow path of the milk through the apparatus, such as in the teat cup, bowl, tube, or communicating special chamber of the milking apparatus, and the remainder of the electronic circuitry utilized may be remotely positioned from the sensing device, as desired. In addition, a plurality of systems can be utilized for individual or cluster indications and/or control of milking to facilitate preferred milking patterns such as enabling milking of each teat, or group of teats, of the animal being milked for differing time periods. To preclude erroneous automatic termination of milking, a delay and/or inhibit may also be utilized for a predetermined period of time after commencement of milking.

27 Claims, 10 Drawing Figures

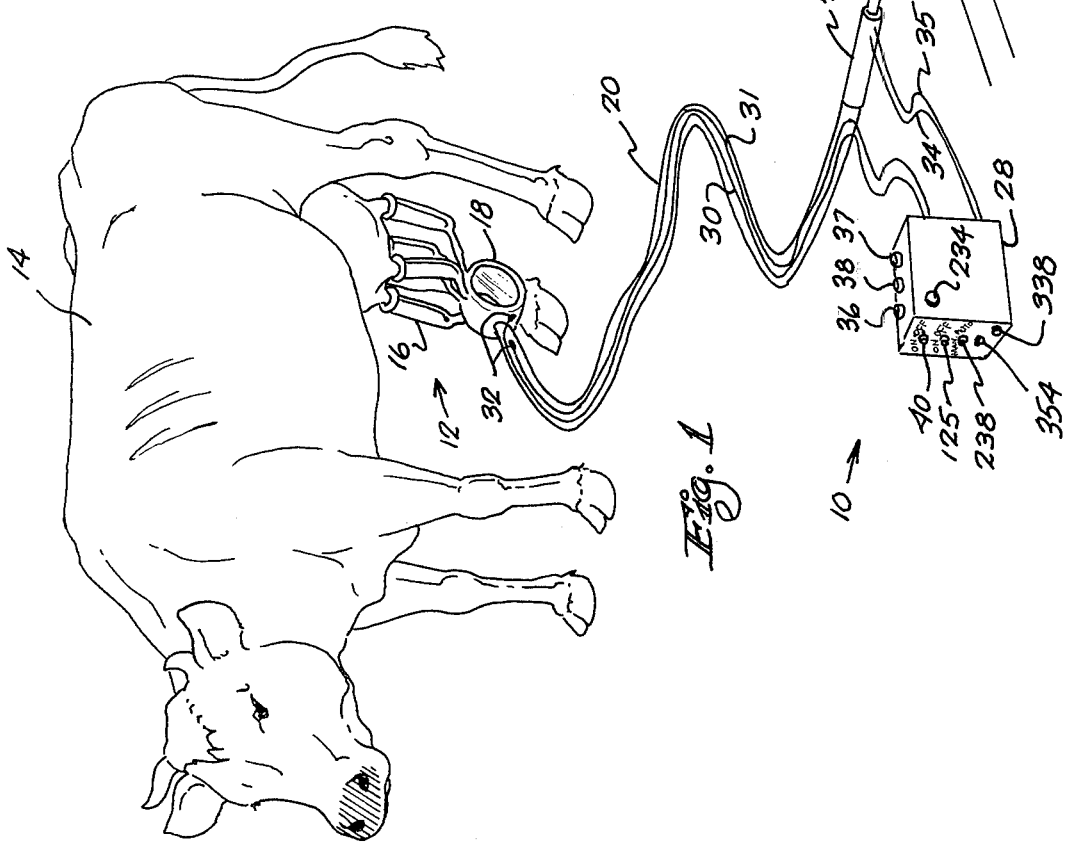

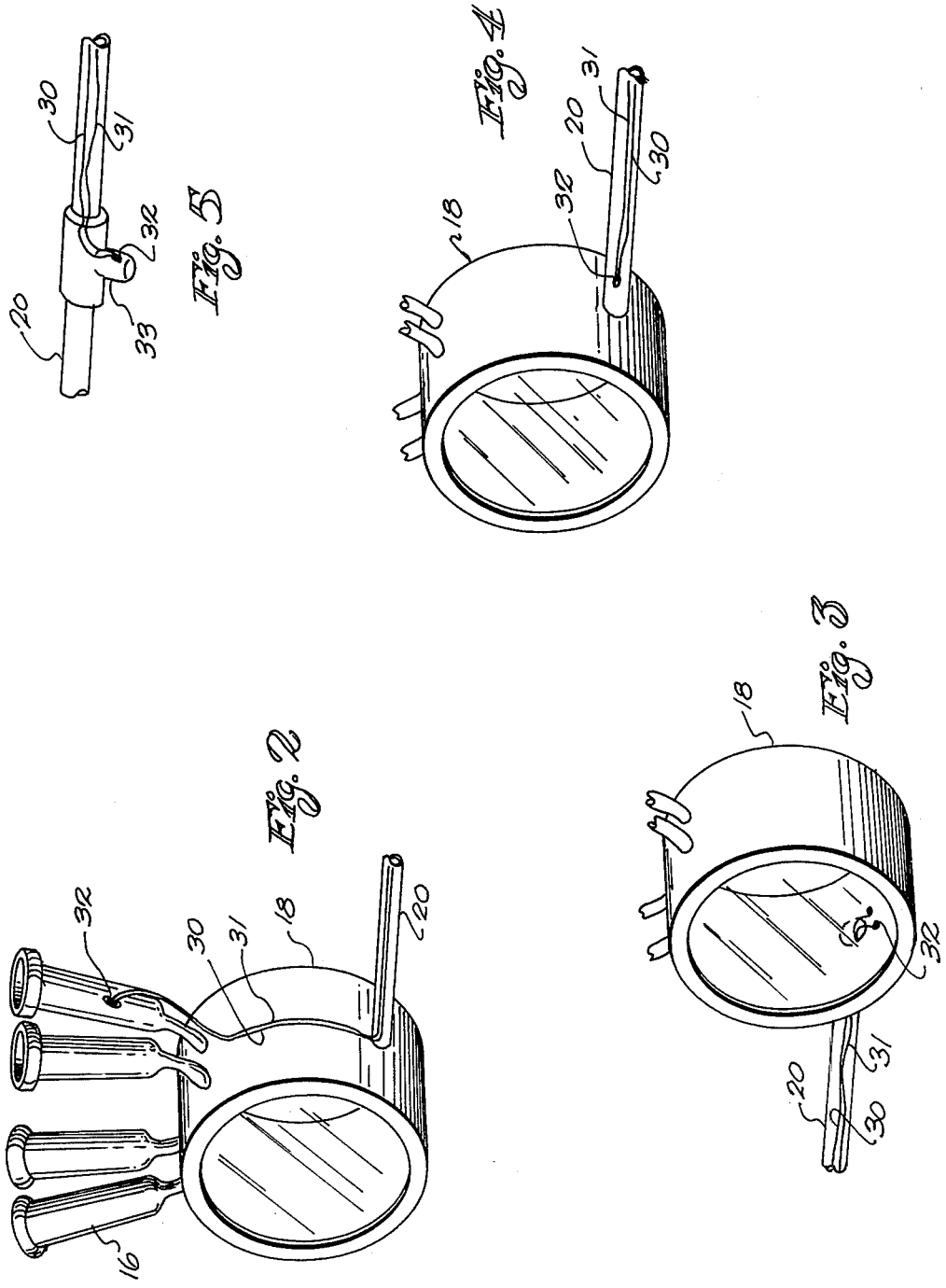

3,874,337

TEMPERATURE RESPONSIVE SYSTEM FOR MILKING APPARATUS

FIELD OF THE INVENTION

This invention relates to a temperature responsive system for a milking apparatus and, more particularly, relates to such a system for indicating and/or controlling milk flow within the milking apparatus, as well as for indicating animal abnormalities.

DESCRIPTION OF THE PRIOR ART

It is well known in the prior art to provide automatic devices for milking of animals, such as cows or goats, and at least some such known milking devices have the capability of causing milk to be withdrawn from the animal and then automatically causing termination of milking upon sensed completion of milking.

One of the more commonly known devices for sensing completion of milking involves the use of fluid flow sensors for sensing milk flow within the milking apparatus. In addition, prior art milking devices have been known and/or utilized which automatically cause removal of the milking apparatus from the animal after completion of milking has been sensed.

While known milking systems have been found to be satisfactory in many respects, these systems have not proven to be completely successful for all purposes, and particularly in adequately and simply sensing completion of milking and indicating and/or terminating the same.

With respect to temperature responsive systems, while such systems have been known and/or used for a variety of applications, including the sensing of milk temperatures within a milking apparatus for such purposes as animal illness detection, temperature responsive systems have not heretofore been known or utilized for indicating and/or controlling milk flow through the milking apparatus or for providing a control signal for enabling removal of the milking apparatus when milking has been sensed as completed. In addition, improvement to temperature responsive systems for sensing animal abnormalities are useful particularly when utilized in conjunction with milk flow indication and control.

SUMMARY OF THE INVENTION

This invention features a temperature responsive system for a milking apparatus that provides indications and/or control of milk flow within the milking apparatus based upon the milk temperature sensed within the milking apparatus. In addition, this invention provides a temperature responsive system that develops an electrical signal indicative of sensed milk temperatures, which developed signal is then utilized to provide indications and/or control of milk flow within the milking apparatus, as well as indicating animal abnormalities discernable by sensed milk temperatures.

It is therefore an object of this invention to provide a novel temperature responsive system for a milking apparatus.

It is another object of this invention to provide a temperature responsive system for a milking apparatus that is suitable for indicating and/or controlling milk flow through the milking apparatus.

It is yet another object of this invention to provide a temperature responsive system for a milking apparatus that develops an electrical signal based upon milk temperatures sensed within the milking apparatus, which signal is indicative of milk flow and is utilized to indicate and/or control milk flow through the milking apparatus.

It is another object of this invention to provide a temperature responsive system for a milking apparatus that provides an indication of animal abnormality when sensed temperatures exceed a certain predetermined value.

It is another object of this invention to provide a temperature responsive system for a milking apparatus that includes temperature sensing means providing an output signal to a comparator means which provides an output for utilization when the signal from the temperature sensing means exceeds a predetermined level, said utilization being directed to a desired and realizable from sensed milk temperatures.

It is still another object of this invention to provide a method for conducting and/or controlling milk flow within a milking apparatus utilizing temperature sensing of the milk within the molking apparatus.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention, together with alternatives thereto, according to the best mode so far devised for the practical application of the principles thereof, and in which:

FIG. 1 is a perspective view of a milking apparatus attached to an animal to be milked and having the temperature responsive system of this invention included therein;

FIG. 3 is a partial perspective view of a portion of the milking apparatus shown in FIG. 1 illustrating positioning of the temperature sensing element included in this invention within the bowl of the milking apparatus;

FIG. 4 is a partial perspective view of a portion of the milking apparatus shown in FIG. 1 illustrating positioning of the temperature sensing element included in this invention within the tubing, or milk line, of the milking apparatus;

FIG. 5 is a partial perspective view of a portion of the tubing, or milk line, of the milking apparatus shown in FIG. 1, illustrating positioning of the temperature sensing element within a special chamber communicating with the milk line;

FIG. 6 is a partial perspective view of a modified milking apparatus for cluster milking of the animal being milked with a temperature responsive system of this invention being provided for each such cluster;

FIG. 7 is a block diagram of the temperature responsive system of this invention;

DETAILED DESCRIPTION

Figure 2:
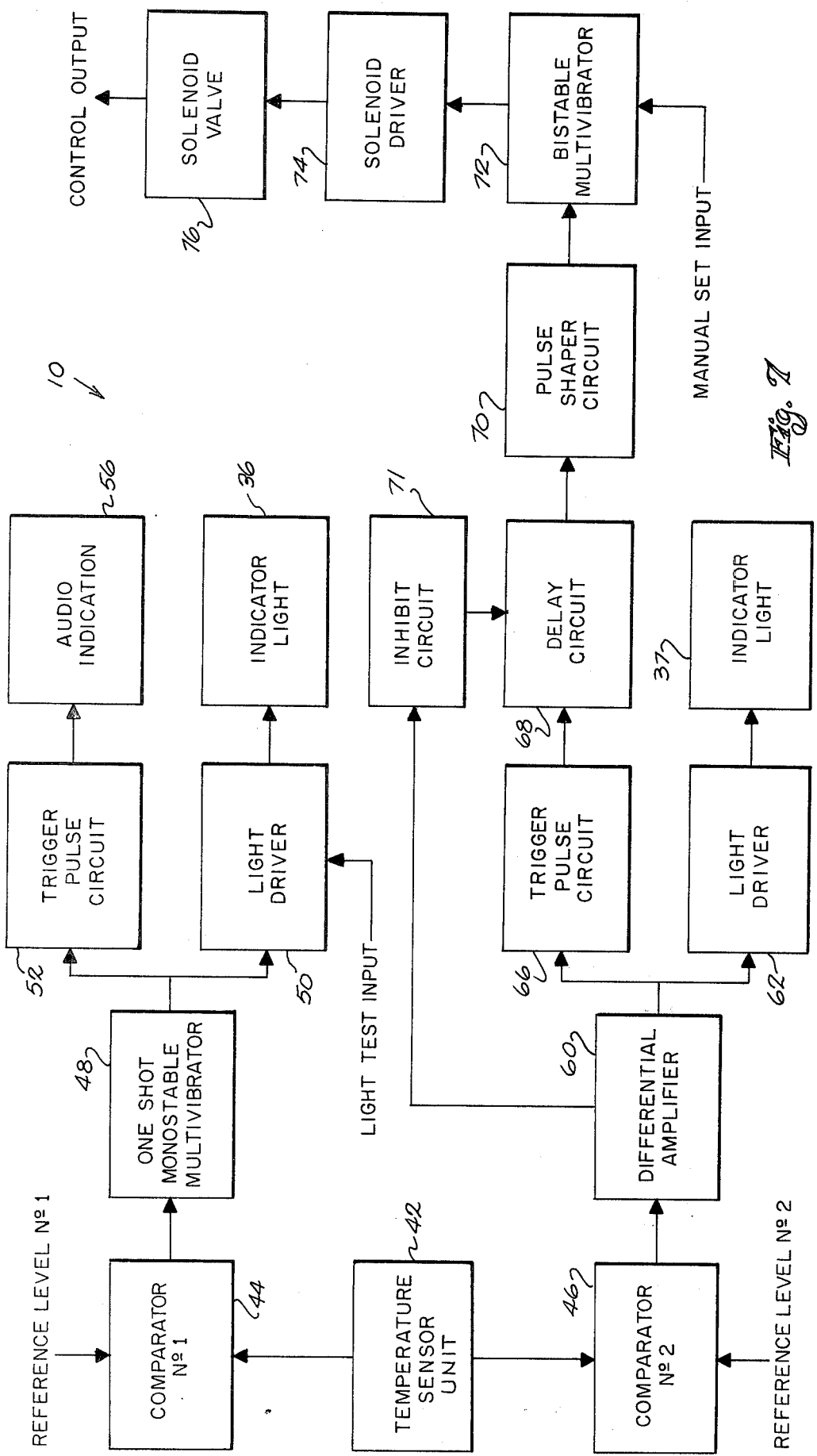
FIG. 2 is a partial perspective view of a portion of the milking apparatus in FIG. 1 illustrating positioning of the temperature sensing element included in this invention within the teat cup of the milking apparatus.

Referring now to the drawings, the numeral 10 indicates generally the temperature responsive system of this invention. As shown in FIG. 1, this system is preferably included or associated with a conventional milking apparatus 12 for milking an animal 14, such as a cow or goat, for example. As is well known in the art, such a milking apparatus includes a plurality of teat cups 16 which are positioned for milking on the teats of an animal in conventional fashion. Milk from the animal is received in the teat cups and conducted therefrom to a conventional bowl 18. Milk is withdrawn from bowl 18 and conducted through tube, or milk line, 20 to one side of a vacuum valve 22, the other side of which is connected in conventional fashion through conduit 24 to a main milk line 26. Variations in the milking apparatus may be made, of course, as would be obvious to one skilled in the art.

Automatic milking systems are well known in the prior art and such systems are shown, for example, in U.S. Pat. Nos. 3,192,900, 3,556,053, 3,690,300, and 3,726,252. As is well known, such systems are normally utilized and terminating milking when completed, such as, for example, by closing a valve in the milk line so that milk is no longer withdrawn from the animal, and at least some such systems provide means for automatically removing the milking apparatus from the animal after completion of milking.

The temperature responsive apparatus of this invention is utilized with a conventional milk apparatus to sense milk temperature and develop an electrical signal indicative thereof that is utilized to indicate and/or control milk flow in the milking apparatus, as well as for sensing and indicating animal abnormalities, the electrical signal thus developed being also utilizable in conventional manner for causing withdrawl of the milking apparatus from the animal after completion of milking is sensed.

As shown in FIG. 1, the temperature responsive system of this invention includes an electronic package 28 having electrical leads 30 and 31 therefrom connected to the temperature sensing device 32 (preferably a thermistor) which as shown in FIGS. 2 through 5, may be within the teat cup 16 (FIG. 2), within the bowl 18 (FIG. 3), in the milk line 20 (FIG. 4), or in special chamber 33 (FIG. 5).

As also indicated in FIG. 1 leads 34 and 35 are provided from the electronic package to the vacuum valve 22 (which may be solenoid actuated, for example, in conventional manner) to control operation of the milking apparatus by controlling the positioning of valve 22 between the open position and the closed position. It is to be realized, of course, that the solenoid could be in the electronic package with air lines (not shown), for example, connected between the package and valve, if desired, for valve control.

As also shown in FIG. 1, red indicator light 36, green indicator light 37 and yellow indicator light 38 may be provided on electronic package 28 to provide visual indications as brought out more fully hereinafter. In addition, an off-on switch 40 is also provided on electronic package 28 to control application of power to the package.

As shown in FIG. 6, it might be desirable to provide a modification of the milker to enable individual or cluster milking of the teats of an animal as, for examile, by controlling the rear two teats and the front two teats by clusters, or groups, with the milk received by each grouping of two teats in teat cups 16 being conducted to a split, or two-chambered, bowl 41. As shown, bowl 41 has two outlets, or milk lines, 20 leading to two valves 22, each of which is controlled by an electronic package 28 in the same manner as shown with respect to the embodiment of FIG. 1. A separate temperature responsive system is provided for each group of cluster, and, as shown in FIG. 6, when two lines are utilized for two groups, two temperature sensing systems are needed, one temperature sensing element being placed in each milk flow path. While two clusters are shown in FIG. 6, it is to be realized that each teat cup could be individually controlled or different groupings could be utilized as desired.

Temperature sensing unit 42 shown in block form in FIG. 7 includes temperature sensing device, or element, 32 within the milking apparatus and a resistive bridge circuit 43 that is within the cletronic package except for temperature sensing device 32 which forms one leg of the bridge circuit and is joined to the remainder of the bridge circuit by leads 30 and 31. The output from unit 42 is coupled to a pair of comparators 44 and 46 each of which receives a reference level voltage, as indicated in FIG. 7. The output from comparator 44 is coupled to one shot monostable multivibrator 48, the output of which is coupled to light driver 50 and trigger pulse circuit 52. An indicator light 36 is connected with light driver 50 to provide a visual indication, preferably a red light, to indicate that an animal abnormality has been sensed. The output of trigger pulse circuit 52 is coupled to audio indicator circuit 56 (shown in detail in FIG. 10 of the drawings). While not specifically shown in the drawings, it is to be appreciated that the abnormality indication may also be utilized to terminate milking in the same manner as described hereinafter with respect to an indication of completion of milking.

Comparator 44 provides an output when the temperature sensed is below a maximum predetermined value indicative of normal animal temperature as should be present during milking. During this period, no output signal is produced to energize the visual (red light) or audible fault alarms. When the temperature rises above the selected maximum value, this is indicative of animal abnormality, as indicating the presence of illness, for example, and the output from comparator 44 goes low to energize the alarm system.

As also shown in FIG. 7, the output from comparator 46 is coupled to differential amplifier 60, the output from which is coupled to light driver 62 for driving indicator light 37, preferably a green light, to indicate the end of milking when comparator 46 responds to a sensed temperature below a predetermined value. In addition, the output from different amplifier 60 is also coupled to a trigger pulse circuit 66, the output of which is coupled to a delay circuit 68. The output from delay circuit 68 is then coupled through a pulse shaper circuit 70 to bistable multivibrator 72 which also has a manual set input provided thereto.

In addition, an inhibit circuit 72 receives an output from differential amplifier 60 and is connected with delay circuit 68 so that inhibit circuit 71 together with delay circuit 68 prevent erroneous indications of completion of milking at the start of milking, and prior to build-up from the flow starting rate within the milking apparatus.

The output from bistable multivibrator 72 is then coupled through solenoid driver 74 to solenoid valve 76 which controls the operation of vacuum valve 22 in the milking apparatus. While not shown in detail, it will be appreciated that a control output (shown in FIG. 7) can be utilized to remove milking machinery from the animal at the completion of milking as is taught in the prior art described hereinabove.

Figure 8:
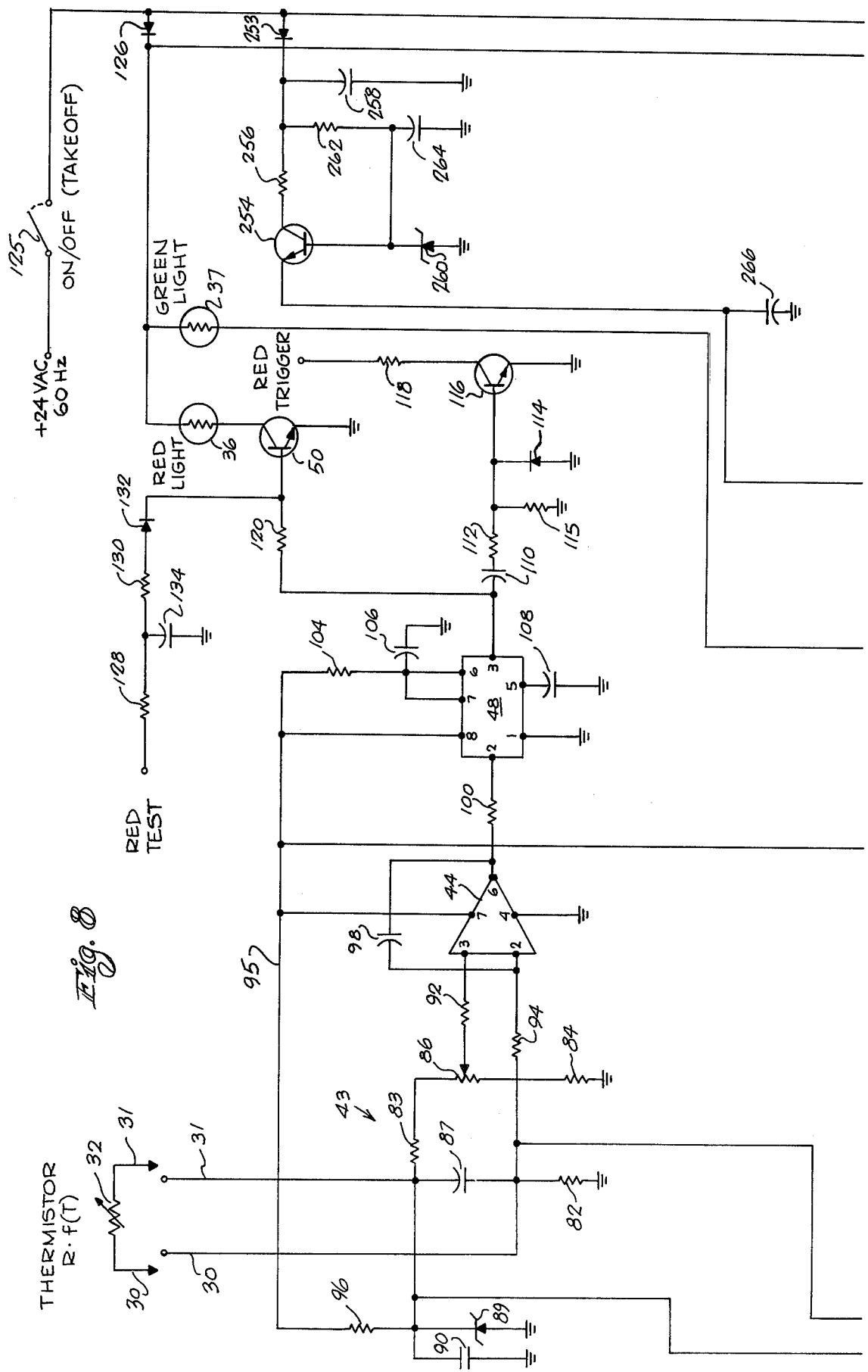
FIGS. 8 and 9 taken together form an electrical schematic diagram of the temperature responsive system of this invention as shown in block form in FIG. 7 except for the audio indicator circuit.

As shown in FIG. 8, temperature sensing device 32 is preferably a thermistor, although it is to be realized that other temperature sensing devices such as thermometers, thermocouples, mercury bulbs and the like might also be utilized to sense the temperature of milk within the milking apparatus as is necessary in this invention. Thermistor 32 is connected by means of leads 30 and 31 to the remaining three legs of bridge circuit 43 which legs include resistors 82, 83, and 84. In addition, a small potentiometer 86 is connected in series with resistor 84 in the resistive bridge. Capacitor 87 is connected across thermistor 32, and lead 31 is connected to Zener diode 89, which diode has capacitor 90 connected in parallel therewith to ground.

The output from the bridge circuit is coupled from potentiometer 86 through resistor 92 to one input of operational amplifier, or comparator, 44. Another input from the bridge to comparator 44 is coupled through resistor 94, as shown in FIG. 8.

Comparator 44 is connected to power lead 95, as is Zener diode 89 through resistor 96 and the output from the comparator is fed back to the input through capacitor 98, which feedback serves to integrate the comparator signal and to reduce the effect of stray noise at the input of the comparator and provides a short delay.

The output from comparator 44 is then coupled through resistor 100 to integrated circuit 48 which functions as a one shot monostable miltivibrator and provides a predetermined width output signal of approximately 30 seconds. Integrated circuit 48 is directly connected with power lead (+12V.) 95 and connected thereto through resistor 104. In addition, capacitor 106 to ground is connected to one side of resistor 104 so that resistor 104 and capacitor 106 form an RC circuit, the time constant of which determines the length of the pulse produced by the integrated circuit 48. A bypass capacitor 108 is also connected between ground and integrated circuit 48.

In operation, integrated circuit 48 operates by providing a pulse, or high output, when the input signal from comparator 44 falls before a predetermined voltage indicating the sensed milk temperatures have gone high due to an abnormality in the animal being milked. If the input stays low, the output from the integrated circuit will stay high and the alarm circuitry (red light 36 and audio circuitry 56) will remain energized and the alarms will remain activated. If on the other hand, the input goes low and then returns to a high state indicating a lower temperature and hence no abnormality is then being sensed, the pulse output will terminate after the pulse width as determined by the RC time constant described hereinabove to de-energize the alarms to indicate that no abnormality is being sensed.

Figure 10:
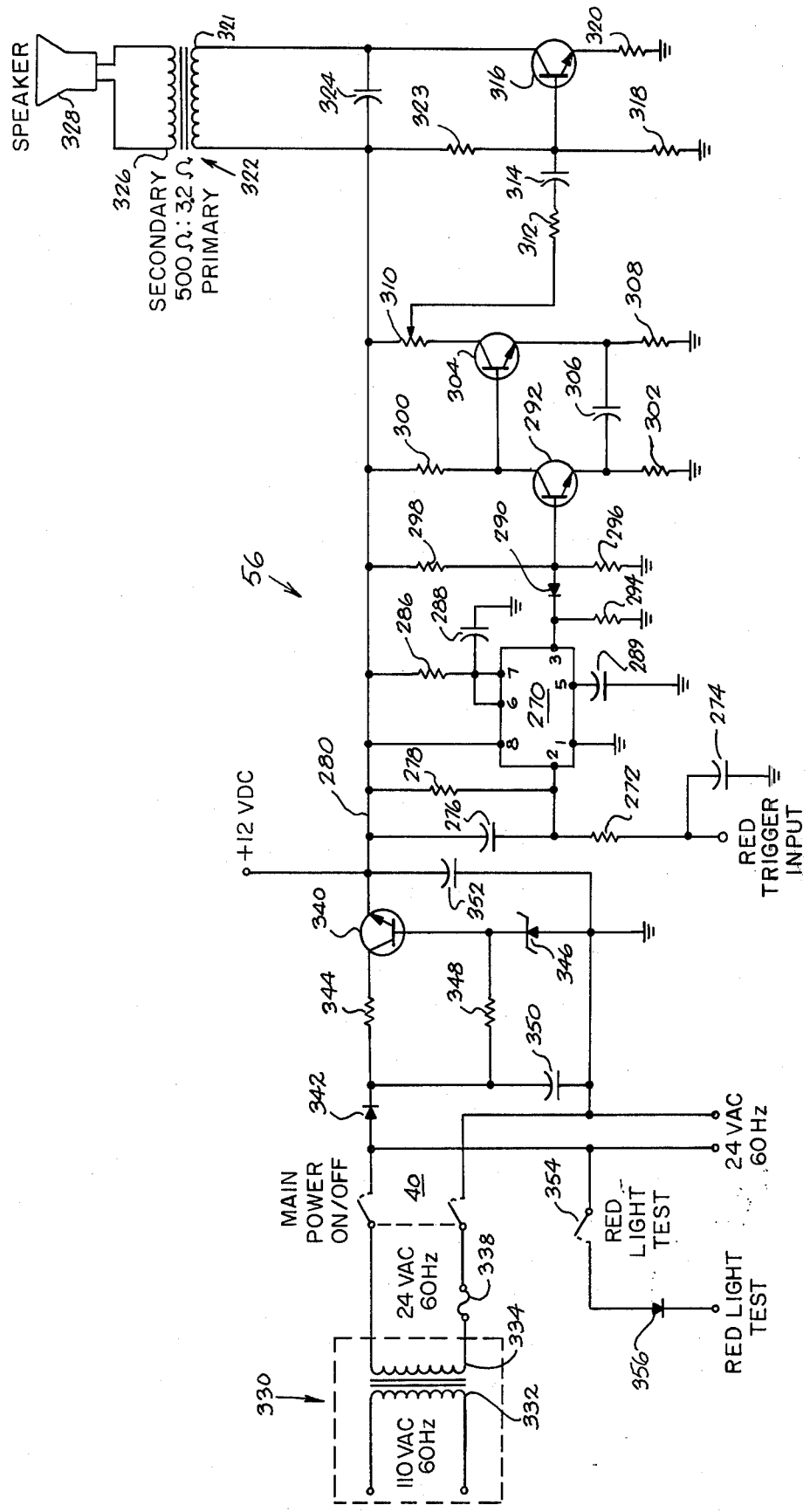
FIG. 10 is an electrical schematic diagram of a power supply and an audio indicator circuit which may be utilized in this invention.

The output from integrated circuit 48 is differentiated by capacitor 110 and resistor 112 connected in series with one another, resistor 112 having a parallel connected diode 114 and resistor 115 to ground connected therewith. The differentiated pulse triggers transistor 116 into conduction to energize an audio indicator 56 (such as shown in FIG. 10), the output from the transistor being coupled to the audio circuit resistor 118.

In addition, the output from integrated circuit 48 is coupled through resistor 120 to the base of transistor, or light driver, 50 which energizes red light 36, the other side of the light being connected to a +24 v. A.C. 60 Hz power supply through off-on switch 125 and diode 126. A test circuit may be provided, as indicated in FIG. 8, through resistors 128 and 130 and diode 132 connected in series with one another, diode 132 being connected to the base of driver transistor 50. A bypass capacitor 134 is also provided to ground from the junction of resistors 128 and 130. A positive voltage is supplied to the red test junction, as indicated in FIG. 10 and when so supplied, the red indicator light 36 is energized.

Figure 9:
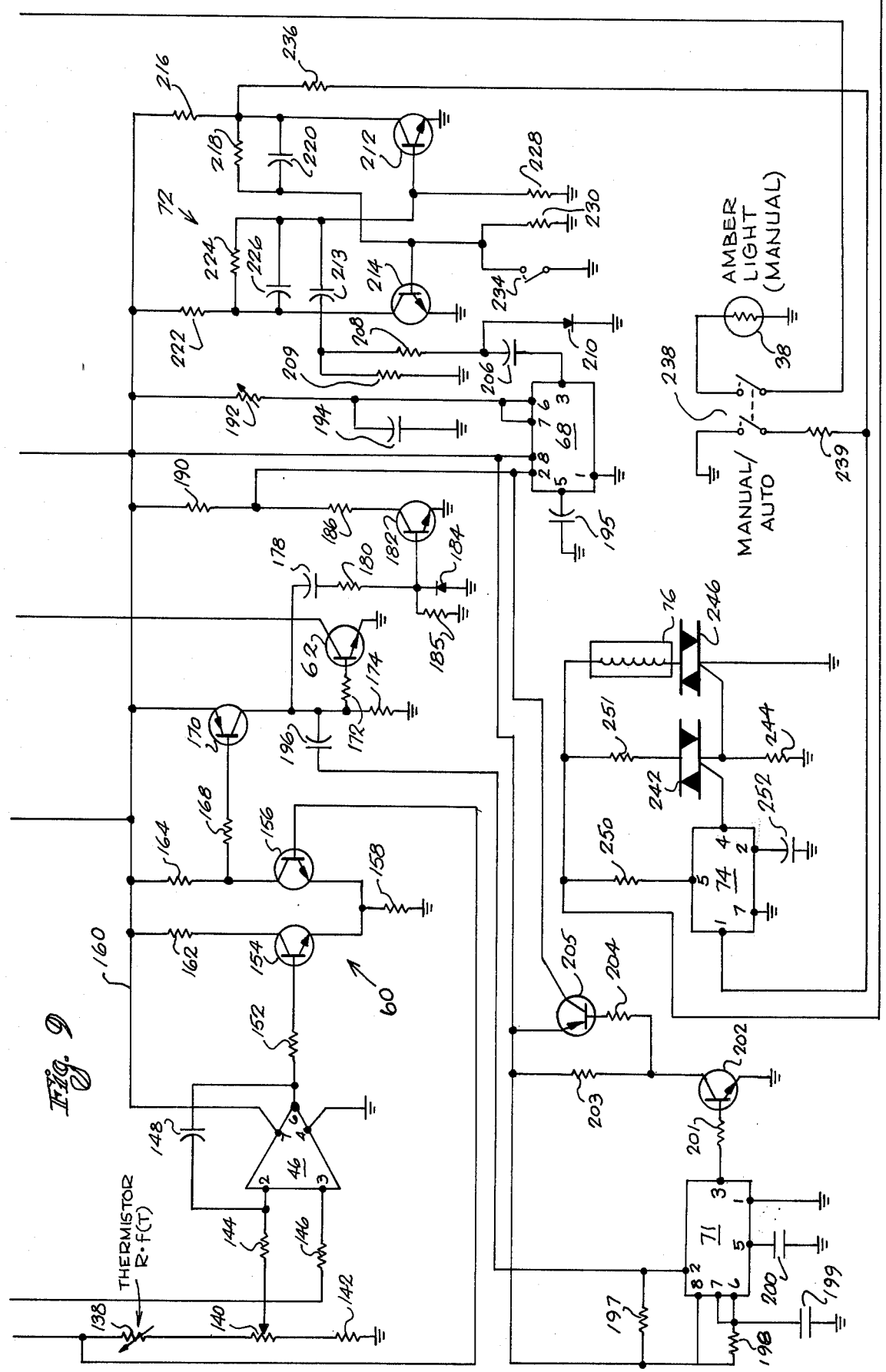

As shown in FIGS. 8 and 9, bridge circuit 43 is also connected to comparator 45. As shown, series connected thermistor 138, potentiometer 140 and resistor 142 are connected between ground and Zener diode 89 with the input to the comparator being taken from potentiometer 140 through resistor 144 in the same manner as provided with respect to comparator 44. Thermistor 138 provides automatic ompensation for ambient temperature variations such as might occur, for example, from summer to winter. The other input is supplied to the comparator through resistor 146, as shown in FIG. 9. The output from the comparator is fed back through capacitor 148 for integration of the signal. The output from comparator 46 is also coupled through resistor 152 to transistor 154 of differential amplifier 60. As is conventional, transistor 156 is coupled to transistor 154 with the emitters being directly connected together and to ground through resistor 158, and the collectors being connected to power lead 160 through resistors 162 and 164, respectively. The output from the differential amplifier is taken from the collector of transistor 156 and coupled through resistor 168 to transistor 170. In addition, the base of transistor 156 is connected with Zener diode 89 to thus set transistor 156 at a value determined by the value of the Zener diode 89.

When the output of the differential amplifier is high, as occurs when the sensed temperature is high indicating proper milking at a sufficiently high predetermined milk flow rate, transistor 154 is turned on, forcing transistor 156 to be in the off condition. When transistor 156 is off, no current flows through resistor 164 which causes transistor 170 to be also in the off condition. When the differential amplifier output goes low, however, which occurs when the temperature sensed by the sensor is lower than a predetermined value indicating a low milk flow rate, transistor 154 goes off and transistor 156 goes on which turns on transistors 170. The output from transistor 170 turns on transistor 62, the base of which is connected to the collector of transistor 170 through resistor 172, the collector of transistor 170 also being connected to ground through resistor 174. When transistor 62 is turned on, the green indicator light 37 is energized to indicate a milk flow rate less than a predetermined value. The green light 37 is connected through off-on switch 125 and diode 126 to the +24 v power supply in the same manner as is red light 36.

The output from transistor 170 is also coupled through series connected capacitor 178 and resistor 180 (which form a differentiating circuit) to the base of transistor 182. In addition, the base of transistor 182 has diode 184 to ground, and is also connected with ground through resistor 185. Transistor 182 has its emitter grounded and its collector connected through resistor 186 to delay circuit 68 and through resistor 186 and resistor 190 to power lead 160. The differentiated output from the differentiating circuit 178 and 180 supplies a short trigger pulse when the end of milking signal first occurs. The pulse triggers integrated circuit 68 (which is a delay circuit) to produce an output having a pulse width determined by the setting of potentiometer 192 connected to delay circuit 68. Potentiometer 192 has a bypass capacitor 194 to ground connected to the junction with integrated circuit 68, and integrated circuit 68 has a bypass capacitor 195 to ground connected therewith.

The collector of transistor 170 is connected through capacitor 196 to inhibit circuit 71 (an integrated circuit as shown in FIG. 9). Integrated circuit 71 is connected to power lead 160 directly and through resistors 197 and 198, and has bypass capacitors 199 and 200 to ground connected therewith. The output from circuit 71 is coupled through resistor 201 to transistor 202, the collector of which is connected to power lead 160 through resistor 203. The output from transistor 202 is taken from the collector through resistor 204 to transistor 105, the collector of which is connected to delay circuit 68.

The output from delay circuit 68 is coupled to a differentiating and clamping circuit which includes series connected capacitor 206 and resistor 208 (which serve as a differentiating circuit) having a diode 210 to ground connected between the junction of resistor 208 and capacitor 206 for clamping, and a resistor 209 to ground connected to resistor 208. This circuitry provides a trigger pulse which occurs at the trailing edge of the output from the delay circuit, which trigger pulse is coupled to bistable multivibrator 72 and more particularly to transistor 212 therein through capacitor 213. Bistable multivibrator 72 also includes a second transistor 214, the bistable multivibrator being used to control a vacuum control valve as indicated in FIGS. 7 and 9.

As shown in FIG. 9, the collector of transistor 212 has a resistor 216 connected therewith to power lead 160 and is connected to the base of transistor 214 through parallel connected resistor 218 and capacitor 220. In like manner, the collector of transistor 214 is connected through resistor 222 to power lead 160 and to the base of transistor 212 through parallel connected resistor 224 and capacitor 226. The base of transistor 212 is also connected through resistor 228 to ground, while the base of transistor 214 is connected to ground through resistor 230. A set switch 234 is connected to ground at one side and at the other side to the base of transistor 214.

The output from bistable multivibrator 72 is coupled through resistor 236 to solenoid driver 74 with the junction of resistor 236 and solenoid driver 74 having connected therewith one side of one pole of automatic/manual double pole switch 238 through resistor 239, the other side of switch 238 being connected to ground. In addition, the other pole of switch 238 is connected at one side to amber light 38 and the other side to the    V. power supply through diode 126 and switch 125.

With respect to bistable multivibrator 72, normally transistor 214 is in the one condition and transistor 212 is in the off condition due to nonsymetrical biasing. When the milking is to be started, the solenoid is activated by momentarily pressing set switch 234 to ground the base of transistor 214 and hence force it to turn off. The multivibrator feedback causes transistor 212 to turn on, which condition remains after the set is released since a bistable multivibrator is utilized.

The output from the bistable multivibrator is coupled to triac driver circuit 74, which circuit acts such that if the input is low, the output turns on triac 242. Energization of triac 242 develops a voltlage across resistor 244 to energize a second triac 246 which energizes solenoid 76. The other side of the solenoid is connected to the +24 V. power supply through switch 125 as is driver amplifier 74 through resistor 250, and triac 242 through resistor 251. In addition, driver amplifier 74 has a bypass capacitor 252 to ground connected therewith.

The trigger pulse supplied by delay circuit 68 is applied to bistable multivibrator 72 when milking is completed to cause transistor 212 to turn off, which causes transistor 214 to turn on, resetting the multivibrator and de-energizing the triacs and solenoid. The manualautomatic switch overrides the multivibrator output so that when this switch is closed the solenoid is activated. When the manual mode is engaged, the amber light is energized.

As shown in FIG. 8, power to the various transistors is supplied from the    volt AC source through switch 125 and diode 253. Diode 253 is connected with transistor 254 through resistor 256 a bypass capacitor 258 being connected between the junction of diode 253 and resistor 256. The base of transistor 254 is connected through Zener diode 260 (12V) to ground, and the junction of the base of transistor 254 and Zener diode 260 is connected to the junction of resistor 262 and capacitor 264, with resistor 262 being connected to the junction of diode 253 and resistor 256, and capacitor 264 being connected to ground. The emitter of transistor 254 is connected to power lead 160 which has a bypass capacitor 266 to ground connected therewith.

As shown in FIG. 10, the input trigger for the audio alarm circuitry 56 is coupled to integrated circuit 270 through resistor 272. A bypass capacitor 274 to ground is connected to one side of resistor 272 while the other side is connected through parallel connected capacitor 276 and resistor 278 to power lead 280 connected to a V. D.C. supply of power. Lead 280 is also connected to integrated circuit 270 through resistor 286 with the integrated circuit being connected to ground through capacitor 288 and 289.

The output from the integrated circuit is taken through diode 290 to transistor 292, which diode has resistors 294 and 296 to ground connected at opposite sides thereof, with resistor 298 being connected to lead 280 and to the junction of diode 290 and resistor 296. The collector of transistor 292 is connected through resistor 300 to lead 280, while the emitter of transistor 292 is connected through resistor 302 to ground. The collector of transistor 292 is also connected to the base of transistor 304 the emitter of which is connected to the emitter of transistor 292 through capacitor 306 and to ground through resistor 308. The collector of transistor 304 is connected through potentiometer 310 to lead 380 with the variable arm of the potentiometer being connected through series connected resistor 312 and capacitor 314 to the base of transistor 316.

The base of transistor 316 is connected through resistor 318 to ground, and the emitter of transistor 316 is connected through resistor 320 to ground. The collector of transistor 316 is connected to one side of primary winding 321 of transformer 322 while the base is connected to power lead 280 through resistor 323, and the other side of primary winding 321 of the transformer is also connected to power lead 280 and has a capacitor 324 thereacross to the collector of transistor 316. Secondary winding 326 of transformer 322 is connected to speaker 328, with the transformer preferably having a 500 ohm to 3.2 ohm ratio.

The power is supplied to the system as shown in FIG. 10, by means of power transformer 330 (stepdown transformer) having a primary winding 332 connectable to a 110 volt 60 Hz source and a secondary winding 334 providing an output voltage of 24 volts AC 60Hz through double pole main off-on switch 40 and a fuse 338 (20 amp slow blow) to a transistor 340 through series connected diode 342 and resistor 344. The junction of diode 342 and resistor 344 is connected to Zener diode 346 (12V) through resistor 348, while a capacitor 350 is connected to one side of resistor 348, the other side being connected to Zener diode 346. A bypass capacitor 352 to ground is connected to the emitter of transistor 340. As also shown in FIG. 10, the red light test signal is supplied through switch 354 and diode 356, the output being coupled to the red light test input as shown in FIG. 8.

In a working embodiment of this invention, the following components were utilized, it being realized, however, that the components listed herein are for illustrative purposes, and the invention is not meant to be limited thereto:

Transistors: 50, 62, 254, 316 and 340 — MJE 340; 116, 154, 156, 182, 202, 212, 214, 292 and 304 — 2N5133; and 170 and 205 — 2N5138

Operational Amplifiers: 44 and 46 — 741

Integrated Circuits: 48, 68, 71 and 270 — SE555CT and 74 — CA3059

Triacs: 242 — 40529; and 246-40535

Zener Diode: 89 — 1N749; and 260 and 346 — 1N5242

Diodes: 114, 126, 132, 184, 210, 253, 290, 342, and 356 — 1N4004

Potentiometers: 86, 140 and 310 — 0 to 1K; and 192 — 0 to 500K

Resistors: 82-15K; 83-5.5K; 84-15K; 92-10K; 94-10K; 96-560; 100-10K; 104-10M; 112-1K; 115-10K; 118-100; 120-1K; 128-1K; 130-1K; 138-5.9K; 142-15K; 144-10K; 146-10K; 152-1K; 158-470; 162-1K; 164-10K; 168-1K; 174-10K; 180-1K; 185-10K; 186-2.2K; 190-10K; 197-10M; 198-10M; 201-10K; 203-10K; 204-2.2K 208-2.2K; 209-1K; 216-1K; 218-3.3K; 222-1K; 224-3.3K; 228-2.2K; 230-3.3K; 236-10K; 239-470; 244-56; 250-470; 251-270; 256-330; 262-2.2K; 272-100; 278-1K; 286-1.8M; 294-10K; 296-3.3K; 298-3.3K; 300-3.3K; 302-3.3K; 308-3.3K; 312-470; 218-4.7K; 320-10; 323-47K; 344-330; and 348-2.7K.

Capacitors (uf): 87-0.068; 90-10; 98-0.068; 106-1; 108-0.068; 110-10; 134-10; 148-1; 178-10; 194-100; 195-0.068; 196-10; 199-10; 200-0.05; 206-10; 213-10; 220-0.001; 226-0.001; 252-100; 258-300; 264-100; 266-100; 274-1; 276-1; 288-2.2; 289-0.068; 306-0.15; 314-0.15; 324-0.15; 350-500; and 352-100.

In operation, the temperature responsive system of this invention senses the temperature of the milk within the milking apparatus and provides an indication of animal abnormalities as well as completion of milking based upon the temperatures sensed, which sensed temperatures are a function of the milk flow rate within the milking apparatus. So long as the milk flow rate is sufficient to keep the temperature elevated above a predetermined minimum temperature and below a predetermined maximum temperature, then normal milking will continue and no abnormalities will be indicated by the red light or audible alarm systems. When the temperature falls below a predetermined point (due to decreased milk flow rate), then the green light will come on to indicate the end of milking and milking will be automatically terminated by de-engerization of solenoid 76. If the control output signal is supplied to takeoff circuitry, then this will automatically cause the circuitry to be disconnected from the animal at the end of milking in a manner known in the art.

If the sensed temperature should rise above a predetermined value, this indicates an animal abnormality, such as illness, for example, and the red light and/or audio indicator circuitry will be energized.

In a working embodiment for milking of cows, it has been found that energization of the alarm circuitry is preferred when the sensed temperature is above about 102.5°F, with the component values preferably being chosen so that an adjustment can be made for alarm circuitry energization of between about 101°F and 104°F. The setting for alarm circuitry energization may, of course, be made initially, as desired, by the user. In addition, potentiometer 140 is preferably set so that the green light and termination of milking occur when the temperature is about 98°F, with the component values again being preferably chosen so that an adjustment between about 95°F and 99°F is possible. Again, the user initially adjusts the setting to the desired value.

The foregoing values were chosen (and are reflected in the working embodiment set forth hereinabove) since it is known that a cow's temperature is normally about 101°F to 101.5°F unless an abnormality, such as illness, has occurred. For proper operation, of this invention, it is necessary that the ambient temperature be below about 95°F so that the sensed milk flow temperatures can vary sufficiently to be sensed between ambient temperatures and the temperature of the cow. In this invention, the sensed temperature is dependent upon the rate of milk flow since, as the flow rate increases, the sensed temperature will increase (up to a temperature equal to or approaching the temperature of the animal), while, as the flow rate decreases, the sensed temperature will decrease (up to a temperature equal to or approaching ambient temperatures). Obviously, the maximum amount of variance is between the cow's temperature and ambient temperature and completion of milking must be sensed between the temper-

What is claimed is:

1. A temperature responsive system for a milking apparatus having milk receiving and conducting means for receiving milk from an animal being milked at a milking area and conducting the received milk from said area, said system comprising:
   temperature sensing means having at least a portion at said receiving and conducting means for sensing the temperature of milk within said receiving and conducting means;
   signal developing means connected with said temperature sensing means for providing an output signal indicative of milk flow rate based upon said sensed temperature; and
   utilization means connected with said signal developing means and responsive to an output signal therefrom.

2. The temperature responsive system of claim 1 wherein said temperature sensing means includes a thermistor positioned within said receiving and conducting means of said milking apparatus.

3. The temperature responsive system of claim 1 wherein said milk receiving and conducting means of said milking apparatus includes a bowl and wherein said temperature sensing means has said portion at said receiving and conducting means within said bowl for sensing the temperature of milk therein.

4. The temperature responsive system of claim 1 wherein said milk receiving and conducting means of said milking apparatus includes a tube and wherein said temperature sensing means has said portion at said receiving and conducting means within said tube for sensing the temperature of milk therein.

5. The temperature responsive system of claim 1 wherein said milk receiving and conducting means of said milking apparatus includes teat cups and wherein said temperature sensing means has said portion at said receiving and conducting means within at least one of said teat cups for sensing the temperature of the milk within said cup.

6. The temperature responsive system of claim 1 further including a chamber communicating with said milk receiving and conducting means of said milking apparatus and wherein said temperature sensing means has said portion within said chamber for sensing temperature of milk within said chamber.

7. The temperature responsive system of claim 1 wherein said temperature sensing means includes a bridge circuit, which circuit includes said portion of said temperature sensing means at said receiving and conducting means as one leg of said bridge circuit.

8. The temperature responsive system of claim 1 wherein said signal developing means includes a comparator circuit for establishing a signal threshold.

9. The temperature responsive system of claim 8 wherein said signal developing means also includes pulse processing means for receiving the output from said comparator circuit, said pulse processing means including a trigger circuit and monostable multivibrator means.

10. The temperature responsive system of claim 1 wherein said signal developing means includes first and second comparators and wherein said utilization means includes a visual indicator and apparatus control circuitry connected to receive the output from said first and second comparators.

11. The temperature responsive system of claim 10 further including an audio indicator connected to receive the output from one of said comparators.

12. The temperature responsive system of claim 1 wherein said signal developing means includes circuit means for preventing erroneous milking state output signals to said utilization means for a predetermined period of time after said milking apparatus is placed in operation.

13. The temperature responsive system of claim 1 wherein said utilization means includes indicating means for indicating animal abnormalities occurring during milking.

14. The temperature responsive system of claim 1 wherein said utilization means includes indicating means for providing an indication of completion of milking.

15. The temperature responsive system of claim 1 further including manual operating means for bypassing control by said temperature sensing means.

16. The temperature responsive system of claim 1 wherein said utilization means includes means for controlling said milking apparatus to automatically terminate milking when an output signal is received from said signal developing means indicating sensed temperatures beyond a predetermined level.

17. The temperature responsive system of claim 1 further including a plurality of milk receiving and conducting means for receiving milk from an animal being milked at a milking area and conducting the received milk from said area at least initially in separate paths, and further including a plurality of temperature sensing means for individually sensing the temperature of milk in each said path, a plurality of signal developing means, each of which is connected with a different one of said temperature sensing means, and a plurality of utilization means each of which is connected with a different one of said signal developing means whereby said animal can be milked in a predetermined pattern and manner.

18. A method for controlling the flow of milk in a milking apparatus said method comprising:
   sensing the temperature of the milk within the milking apparatus;
   developing a signal based upon said sensed temperature that is indicative of the rate of milk flow within said milking apparatus; and
   utilizing said developed signal to vary the rate of milk flow and thereby operationally control said milking apparatus.

19. The method of claim 18 further including utilizing said developed signal by indicating animal abnormalities during milking and completion of milking.

20. The method fo claim 18 wherein utilizing said developed signal to vary the rate of milk flow includes terminating the milking operation when sensed temperatures indicate completion of milking.

21. A temperature responsive system for a milking apparatus having milk receiving and conducting received milk from said area, said system comprising:
- temperature sensing means having at least a portion at said receiving and conducting means for sensing the temperature of milk within said receiving and conducting means and providing an output indicative thereof;
- comparator means for receiving said output from said temperature sensing means and providing a predetermined output when said input signal reaches a predetermined level;
- signal processing means connected with said comparator means and providing a processed output signal indicative of output received from said comparator means; and
- utilization means connected with said processing means for receiving the output signal therefrom.

22. The temperature responsive system of claim 21 wherein said system includes a second comparator receiving the output from said temperature sensing means and providing a predetermined output when said input reaches a second predetermined level.

23. The temperature responsive system of claim 21 wherein said milking apparatus includes means providing separate milk paths from predetermined teats of an animal being milked, and wherein a temperature responsive system is provided for each of said milk paths to enable individualized miling of each animal in a predetermined manner.

24. The temperature responsive system for a milking apparatus having milk receiving and conducting means for receiving milk from an animal being milked at a milking area and conducting received milk from said area, said system comprising:
- temperature sensing means including a bridge circuit one leg of which has at least one temperature sensing element within said receiving and conducting means for sensing the temperture of milk within said receiving and conducting means;
- a first comparator connected with said bridge circuit and providing a predetermined output when a predetermined level of input signal is reached;
- a one shot multivibrator connected to receive the output from said first comparator;
- first indicating means connected to receive the output from said one shot multivibrator for indicating an animal abnormality sensed during milking by said temperature sensing means;
- a trigger pulse circuit connected to receive the output from said one shot multivibrator;
- an audio indicator circuit connected to receive the output from said trigger pulse circuit and provide audible indications of a sensed animal abnormality when an abnormality is sensed by said temperature sensing means;
- a second comparator connected to receive the output from said brideg circuit, and providing a predetermined output when a predetermined level of input signal is reached;
- a differential amplifier connected to receive the output from said second comparator;
- second indicator means connected to said differential amplifier to indicate completion of milking when an output is received from said differential amplifier;
- a second trigger pulse circuit connected to receive the output from said differential amplifier;
- delay and inhibit circuit means connected to receive the output from said second trigger pulse circuit and said differential amplifier; and
- control means for controlling the operation of said milking apparatus to terminate milking when an output is received from said delay circuit indicating completio of milking.

25. The temperature responsive system of claim 24 wherein said system includes means for bypassing said contrl means whereby manual termination of milking is provided.

26. The temperature control system of claim 24 wherein said control means provides an output signal suitable for causing said milking machine to be automatically withdrawn from the animal being milked when an output signal is coupled from said control means.

27. The temperature control system of claim 24 wherein said bridge circuit includes a second temperature sensing element for providing automatic compensation for ambient temperature variation.

* * * * *